(12) United States Patent
Thottathil et al.

(10) Patent No.: US 9,862,835 B2
(45) Date of Patent: Jan. 9, 2018

(54) WINDOW COATING

(71) Applicant: WindowAlert, Inc., Bend, OR (US)

(72) Inventors: Paul Thottathil, New Hyde Park, NY (US); Purushothaman Kesavan, Elmont, NY (US); John Ryan, Bellmore, NY (US); Satyabrata Mukherjee, Westbury, NY (US)

(73) Assignee: WINDOWALERT, INC., Bend, OR (US)

( * ) Notice: Subject to any disclaimer, the term of this patent is extended or adjusted under 35 U.S.C. 154(b) by 581 days.

(21) Appl. No.: 13/959,533

(22) Filed: Aug. 5, 2013

(65) Prior Publication Data

US 2014/0037838 A1 Feb. 6, 2014

Related U.S. Application Data

(60) Provisional application No. 61/679,551, filed on Aug. 3, 2012.

(51) Int. Cl.

| F21V 9/04 | (2006.01) |
|---|---|
| C09D 5/33 | (2006.01) |
| C09D 4/00 | (2006.01) |
| C09D 5/00 | (2006.01) |
| C08J 7/16 | (2006.01) |
| C08F 222/10 | (2006.01) |

(52) U.S. Cl.
CPC ............ C09D 5/004 (2013.01); C08J 7/16 (2013.01); C09D 4/00 (2013.01); C09D 5/008 (2013.01); *C08F 222/1006* (2013.01)

(58) Field of Classification Search
USPC ...................... 252/589; 427/157; 428/195
See application file for complete search history.

(56) References Cited

U.S. PATENT DOCUMENTS

| 5,407,728 A * | 4/1995 | Kerr ............... B60R 21/235 139/420 A |
| 2007/0059468 A1* | 3/2007 | Kirkegaard ............ B32B 1/08 428/36.91 |
| 2013/0310479 A1* | 11/2013 | Lee .................. C09D 11/101 522/18 |

* cited by examiner

*Primary Examiner* — Monique R Peets
(74) *Attorney, Agent, or Firm* — Schwabe Williamson & Wyatt, PC

(57) ABSTRACT

Provided herein are graft coating formulations for windows that can help reduce or prevent bird strikes via a combination of UV reflectivity and fluorescence. These graft coating formulations may include an acrylic monomer, a diacrylic monomer, a graft initiator, and a catalyst, and when applied to a glass or plastic substrate, may reflect more than about 70% incident light having a wavelength of less than 400 nm, and also may fluoresce when exposed to light having a wavelength of less than about 400 nm. This combination of reflectivity and fluorescence may render the window visible to birds, while still appearing transparent to humans.

18 Claims, 3 Drawing Sheets

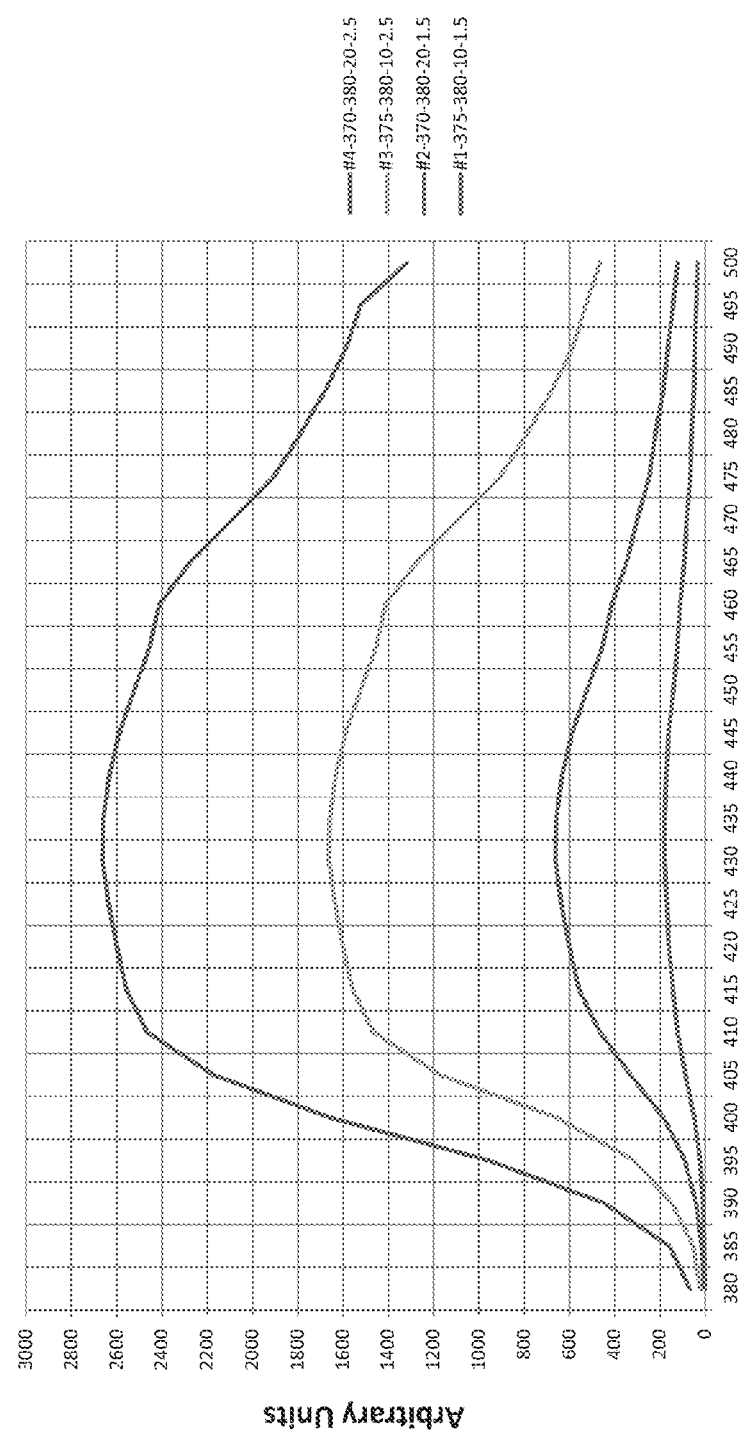

WINDOW COATING

CROSS REFERENCE TO RELATED APPLICATIONS

The present application claims priority to U.S. Provisional Patent Application No. 61/679,551, filed Aug. 3, 2012, entitled "WINDOW COATING," the disclosure of which is hereby incorporated by reference in its entirety.

TECHNICAL FIELD

Embodiments herein relate to the field of UV-reflective and/or fluorescent coatings for glass substrates.

BACKGROUND

Building glass is nearly invisible to most birds, and bird strikes against glass are usually fatal to the bird. Even if a bird initially recovers sufficiently to fly away after striking a window or other glass surface, it often will die later from internal hemorrhaging. Estimates of the number of avian deaths from glass strikes range from 100 million to one billion per year in North America. These collisions represent a leading cause of death to many bird populations, second only to habitat loss. Glass has many advantages as a green building material, and is likely to remain a popular choice of building materials in the coming years.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 3 illustrates a graph showing the fluorescence of one of the three graft-coated glass samples of FIG. 1, and focuses on fluorescence emissions in the 380-400 nm range of the light spectrum, in accordance with various embodiments.

DETAILED DESCRIPTION OF DISCLOSED EMBODIMENTS

Figure 1:
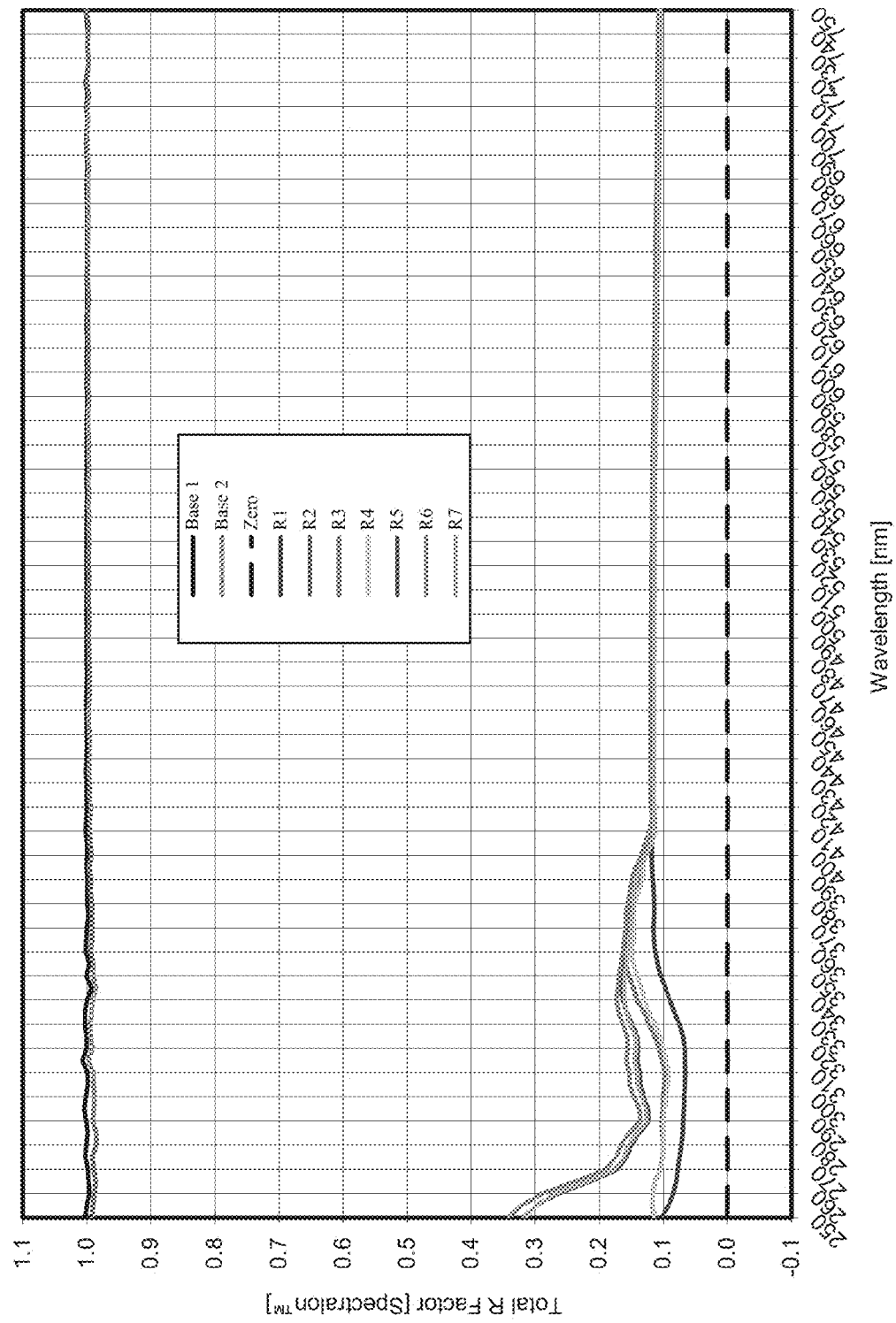
FIG. 1 illustrates a graph showing the UV reflectivity of three graft-coated glass samples, as compared to three glass samples with UV-reflective adhesive decals, and an untreated sample, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide protective graft coating formulations for glass and other transparent substrates, which formulations both reflect light in the UV range of the light spectrum and also fluoresce in the visible and/or UV range of the spectrum, rendering the substrate visible to avian species, yet retaining a transparent appearance to humans. Many bird species can discriminate wavelengths of light in the UV and near-UV range. These wavelengths are shorter than the threshold wavelengths observable by humans, which typically start at around 400 nm. This is because, while humans have three types of photoreceptive retinal cone cells, birds typically have a fourth type of cone that confers quadchromatic color vision. These extra cones expand the visible light spectrum for birds.

Thus, UV-reflective coatings and decals may serve to prevent birds from colliding with window glass, while remaining comparatively invisible to human eyes. Some such UV-reflective coatings and decals are known to those of skill in the art. However, such coatings and decals typically only reflect a small portion of the incident light. By contrast, the graft coating formulations disclosed herein both reflect a large portion of incident light within the UV spectrum, and also fluoresce in the UV and/or visible spectrum, greatly enhancing their visibility to avian species in both high and low light settings. As used herein, the term "fluorescence" refers to the emission of light by a substance that has absorbed light or other electromagnetic radiation. It is a form of luminescence. In most cases emitted light has a longer wave length, and therefore lower energy, then the absorbed radiation. In addition to the light-emitting and light-reflecting properties of the disclosed graft coatings, the formulations provided herein also may provide excellent abrasion, scratch, shatter, and wear resistance when applied to glass and other transparent surfaces, while also reducing or preventing bird strikes when the coating formulations are used on windows and other building applications.

In various embodiments, the coating formulations disclosed herein are chemical graft coatings. Chemical grafting generally involves the transplantation of monomers to various substrates, for example to improve their positive properties without any basic change to the substrate itself. In various embodiments disclosed herein, the monomers/prepolymers to be grafted may be selected such that the polymeric film grafted onto the substrate has the tendency to reflect and fluoresce light in the UV spectrum, while appearing clear (to the human eye) in ordinary light. In some embodiments, the disclosed graft coating formulations may reflect about 10%, about 20%, about 30% about 40% about 50%, about 55%, about 60%, about 65%, about 70%, about 75%, about 80%, about 85%, about 90%, or about 95% more of the incident light having a wavelength of under 400 nm when compared to untreated glass. For example, some embodiments of glass that has been graft coated in accordance with various embodiments may reflect about 93% more UV light than uncoated glass.

In various embodiments, such polyfunctional monomers/prepolymers may include vinyl monomers and/or urethane prepolymers, which may become chemically bonded to the substrate during the grafting process. In some embodiments, such monomers may include urethane or acrylic monomers having one or more hydroxyl, carboxyl or glycidyl group. In various embodiments, suitable substrates include glass and plastics, such as polyethylene, polypropylene, Teflon™, polyvinyl chloride, polycarbonate, and polyethylene terephthalate.

In various embodiments, one or more graft initiators may be used to initiate and/or perpetuate the grafting process. For example, in order to initiate grafting, the surface of the substrate may be prepared to accept the graft. In various embodiments, graft initiators (also referred to herein as chemical activators) provide chemical means for exposing active sites on the surface of the substrate to initiate grafting. In various embodiments, application of the graft initiator, chemical activator, and/or monomer solution may be carried out by simply spraying, dipping, painting, or rolling the desired substance onto the substrate surface, and the surface preparation may be carried out in a single step in various embodiments. Because of the small size of the monomers used in the disclosed graft coating applications, the penetration of the monomers into the surface of the substrate is high, and a pinhole-free coating is easily obtainable if desired.

Because the attachment of graft coatings is accomplished by forming a chemical, covalent bond with the substrate, much thinner graft coatings may provide extended life and superior adhesion, when compared to conventional coatings. Conventional coatings (e.g., coatings bonded with a physical rather than chemical bond) may be used for a variety of applications, for example, to improve the appearance of a substrate, for corrosion protection, for electrical insulation, or for adhering two materials together. In each case, conventional coatings adhere to substrates by simple physical forces, which may be easily broken. Consequently, peeling or delamination frequently occurs. Such is not the case in graft coating applications.

The process of graft coating may be visualized as the growth of "whiskers" onto a material. These whiskers are joined to the substrate by means of a chemical bond. This is very different from conventional coatings, where the bond between the substrate and the coating is only a physical bond. With graft coating, a much higher degree of permanence is achievable. Conversely, the degree of permanence may be engineered to have a finite lifespan, if desired. For example, in the case of window coatings, a graft coating may be designed to be permanently grafted to the substrate, or it may be designed to have a particular lifespan. In some embodiments, this lifespan may be one month, three months, six month, nine months, or a year or more, and may be tailored to coincide with an expected window washing frequency in some embodiments. While some graft coatings may be tailored to degrade after a particular time interval, other graft coatings may be engineered to remain attached to the substrate until deliberately removed by a user, for example with a window cleaning product that contains a strong detergent.

In some embodiments, it may be desirable for a graft coating formulation to be removable or to degrade within a particular period of time because some users may be reluctant to apply a permanent formulation to their windows. Additionally, some UV reflective window decals are known to deteriorate with age and take on a yellow tint, making them more visible to a user, and therefore less desirable. Although the graft coating formulations disclosed herein typically do not yellow with age, formulating the coating to be removable avoids this concern entirely.

Yet another advantage of graft coatings is the avoidance of environmental pollutants and harsh chemical agents. Typically, the disclosed graft coating reactions make use of emulsions or aqueous solutions, and the necessary organic materials are solubilized in water. Additionally, by the time the graft coating process is complete, the organic materials typically are essentially exhausted, leaving few or no environmental contaminants behind.

Many materials, both naturally occurring and synthetic, include hydrogen molecules that are more reactive than "bulk hydrogens." For example, the tertiary hydrogen in polypropylene, represented below as (I), the amide hydrogen in proteins, represented below as (II), and the hydroxyl hydrogen in n polysaccharides, represented below as (III), are examples of hydrogen molecules that are more reactive than bulk hydrogens.

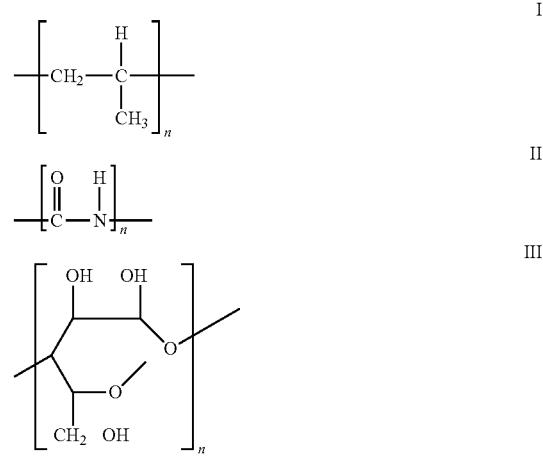

In various embodiments, a chemical activator (CA; also referred herein to as a "Graft Initiator") may have the capacity to remove these active hydrogens, concomitantly initiating the growth of polymer chains at the site from where the active hydrogen was removed. In the case of polypropylene, this process may be represented as follows:

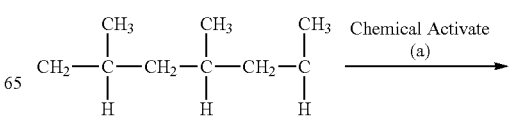

-continued

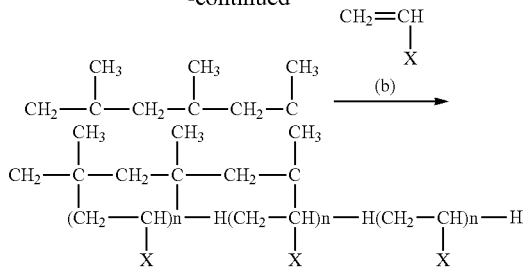

In addition to these types of materials, in some embodiments, substrates which ordinarily would not be considered to possess "active hydrogens," such as silicon, metals, polycarbonate, and the like may be substituted. In these embodiments, sites for attachment are provided, where possible, by the removal of a hydrogen from the substrate, or by the removal of labile electrons that may be available from the bulk of the material.

The following is a general description of the graft coating process. Although a general procedure is described, one of skill in the art will appreciate that the details of the process may be varied in order to create a desired effect, such as the relative permanence or impermanence of a graft coating, the UV fluorescent and UV reflective properties of a graft coating, and/or other features such as scratch resistance.

In essence, chemical grafting involves growing polymer chains on the backbone chain of a substrate. In some embodiments, the grafted polymer chains may be formed from vinyl monomers containing appropriate functionality, e.g., groups such as hydroxyl, carboxyl, epoxy, amide, amine, anhydride, etc. In various embodiments, the series of steps involved in the mechanism of chemical grafting to produce grafted polymer chains on any substrate are represented schematically below. In accordance with one embodiment, the basic starting material (hereinafter referred to as "substrate") may be glass, which may be represented as S—OH, where S represents the base glass material. In various embodiments, any type of glass may be used, such as soda-silica-lime glass, and the like.

Without being bound by theory, it is believed that, as a first step to grafting, a substrate radical may be formed, presumably by the removal of a hydrogen ion or atom from the glass substrate, e.g., from the hydroxyl (—OH) group, by a graft initiator (represented in the reaction step below as "GI"). In various embodiments, the graft initiator may remove hydrogen and any of zero, one, or two electrons. An example of a series of steps involved in the grafting process are given in steps 1-7 below:

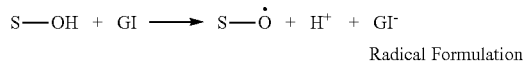

(1)

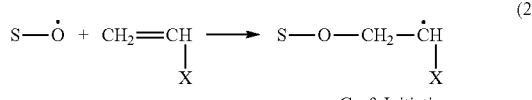

Radical Formulation (2)

Graft Initiation

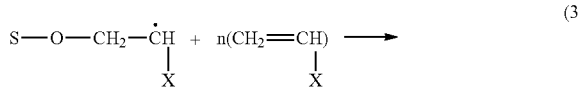

(3)

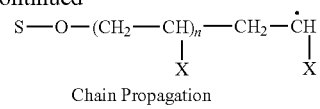

Chain Propagation

In various embodiments, all of the foregoing reactions may take place in the presence of peroxide, which may concurrently regenerate the graft initiator as shown in reaction (4).

$$GI^- + ROOH \rightarrow RO + OH^- + GI \quad (4)$$

In various embodiments, the graft propagation process may be terminated by radical combination, as shown in reactions (5) and (6).

(5)

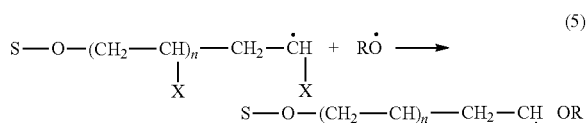

(6)

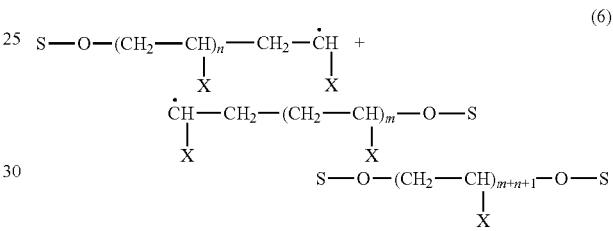

In various embodiments, Reaction (6) may be particularly effective at producing a chemical bridge between the substrates. In some embodiments, the side functional group X may be chosen such that its further interaction with the substrate may produce desired properties, e.g., adhesion, permanence or removability, barrier properties, UV reflectivity, fluorescence, or other desired characteristics.

The process of initiation, propagation, and termination may be different when an anion or cation is generated by the GI, when the formulation contains reactive prepolymers or polymers. For example, prepolymers may undergo activation by the graft initiator giving reactive species P which react with the radical on the glass substrate to form a graft coating on the substrate, as follows:

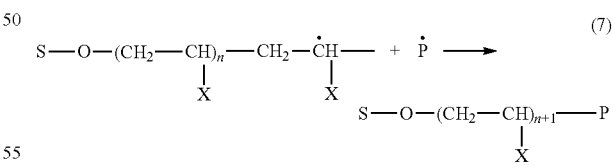

(7)

In various embodiments, the graft initiator ion may begin the process, and the whole reaction behaves like an anti-catalytic reaction. In various embodiments, a small amount of graft initiator ion (e.g., 5 to 10 ppm) therefore may be sufficient to carry out the process of graft polymerization. In accordance with various embodiments, all of the foregoing reactions are understood to take place in the presence of peroxide, which concurrently regenerates the graft initiator, forming a free radical.

(8)

In the case of polyester, the reaction may take place in the following manner:

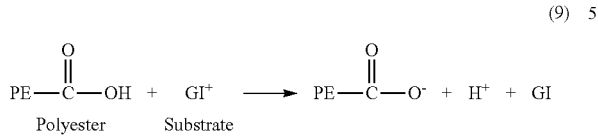 (9)

In various embodiments, the free radical carbonyl group thereafter may react with either a first component or a second component (eg. CH$_2$=CH)
       |
       X

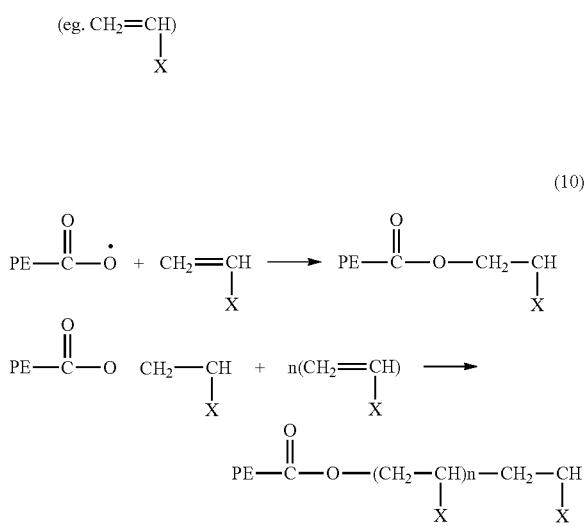 (10)

The process may be terminated by radical combination.

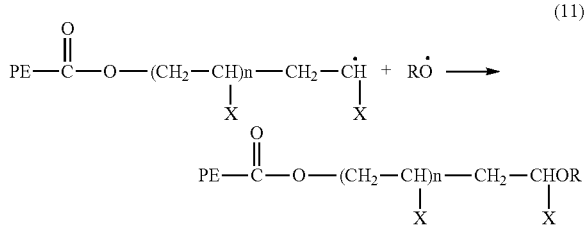 (11)

EXAMPLES

The following examples illustrate methods of making and using the graft coating formulations disclosed herein. However, the scope is not limited to the specific details set forth in the following examples.

Example 1

Method of Making a Graft Coating Formulation

Requisite amounts of various ingredients were combined in a container and mixed. These included one or more urethane prepolymers, thickeners, monomers, water and/or other solvents, fluorescent agents, catalysts, and graft initiators. The contents were stirred to a uniform solution. The graft coating solution thus prepared was ready for application onto the glass substrate.

Example 2

Method of Applying a Graft Coating Formulation to a Substrate

The graft coating formulation thus prepared was applied to a glass substrate by spraying. In other embodiments, the coating formulation also may be applied by dipping, rolling, brushing, or any other convenient method. The coating was air dried for a few hours, however in other embodiments the coating may be force cured using a hot gun or hot air.

Although various embodiments disclosed herein describe application of graft coating formulations to existing windows, one of skill in the art will appreciate that such formulations also may be applied to other glass and plastic surfaces, and it may be applied to window glass as part of the window manufacturing process. In some embodiments, such window coatings may be removed and reapplied as desired. For example, and older coating may be removed and a fresh coating applied as a part of the normal window washing cycle.

Example 3

Exemplary Formulation by Weight

This example illustrates one specific, non-limiting example of a graft-coating formulation in accordance with various embodiments.

| Name of Chemical | Parts by Weight |
| --- | --- |
| Diethylene Glycol Monobutyl Ether (D.B. Solvent) | 80.00 |
| Isopropyl Alcohol | 80.00 |
| Dispersant Triton X-IOO ™ | 3.00 |
| Polyethylene Glycol 400 Dimethacrylate SR344 | 0.50 |
| Deionized water | 200.00 |
| Aqueous Polyurethane Dispersion Picassian PU 490 ™ | 120.00 |
| Fluro Surfuctant FC 4430, 2.0% solution in water | 4.00 |
| Alkoxylated Triacrylate SR 9035 | 2.00 |
| Urea Peroxide 1.0% solution in water | 0.20 |
| Silver Perchlorate 0.1% solution in water | 0.10 |
| Benzo Pyranne Pylaklor White | 3.00 |
| Polyazridine catalyst CX-IOO | 0.80 |

Example 4

Alternate Exemplary Formulation by Weight

This example illustrates another specific, non-limiting example of a graft-coating formulation in accordance with various embodiments.

| Name of Chemical | Parts by Weight |
| --- | --- |
| Aqueous Urethane Prepolymer - Neorez R 9679 | 50.00 |
| Isopropyl Alcohol | 30.00 |
| Deionized Water | 200.00 |
| Dispersant Triton X-100 | 20.00 |
| Diethylene Glycol Monbutyl Ether | 20.00 |
| Sodium Vinyl Salfonate | 0.10 |
| Urea Peroxide 1.0% Solution in Water | 0.20 |
| Silver Perchlorate 0.1% Solution in Water | 0.10 |

-continued

| Name of Chemical | Parts by Weight |
|---|---|
| 2.0% Solution of Fluoro Surfactant FC4430 in Water | 5.00 |
| Polyethylene Glycol 400 Dimethacrylate SR 344 | 1.00 |
| Flow Agent Silvet L7001 | 0.10 |
| Alkoxylated Triacrylate SR 9035 | 0.10 |

Example 5

Additional Exemplary Formulation by Weight

This example illustrates another specific, non-limiting example of a graft-coating formulation in accordance with various embodiments.

| Name of Chemical | Parts by Weight |
|---|---|
| D.B. Solvent (Butyl Carbitol) | 80.00 |
| Isopropyl Alcohol | 160.00 |
| Alkoxylated Aliphatic Diacrylate Ester Monomer - SR 9209A | 0.10 |
| Alkoxylated Cyclohexane Dimethanol Diacrylate Ester Monomer CD 582 | 0.10 |
| Benzo Pyranone Pylaklor White S-5 | 2.40 |
| Deionized Water | 200.00 |
| 0.1% Urea Peroxide in Water | 0.10 |
| 0.1% Ferrous Ammonium Sulfate | 0.10 |
| Dispersant Triton X100 ™ | 2.50 |
| 2.0% Fluorosurfactant FC 4430 in Water | 3.00 |
| Aliphatic Urethane Prepolymer Picassian PU490 | 40.00 |

Example 6

Measurement of UV Reflectivity and UV Fluorescence in a Sample of Graft-Coated Glass As illustrated in FIG. 1, three 1×1 inch samples of glass treated with a commercially available UV reflective decal (designated R2, R3, and R4 in FIG. 1), three 1×1 inch samples of glass treated with the graft coating formulation of Example 5 (designated R5, R6, and R7 in FIG. 1), and one 1×1 inch sample of untreated (control) glass (designated R1 in FIG. 1) were exposed to light having wavelengths of 250-750 nm, and total reflectance [R] was measured at 7 degrees angle of incidence (AOI) with a Cary 500E UV-Vis-NIR spectrophotometer equipped with a 150 nm integrating sphere. All of the graft coated samples (R5, R6, and R7) showed excellent reflectivity in the UV range (e.g., under 400 nm). The UV reflective decals (R2, R3, and R4) also showed increased reflectivity in the UV range, though not as robust as the graft-coated samples, when compared to control.

In FIG. 1, the x-axis runs from 250 to 750 nm, and the y-axis from −0.1 to 1.1 [−10 to 110%] total R for the coated side of each glass sample. The baselines run before and after the samples appear superimposed at y=1.0=100%; the zero line run after the samples appears at y=0.0=0%.; and the sample measurements appear in between. From about 400 to 750 nm, the segment of the spectrum visible to humans, the seven traces are very similar, with R values of between 0.10 and 0.12 [10% to 12%]. Thus, to the human eye, the uncoated and coated samples would appear virtually identical.

In the UV range of the spectrum, from 250 to 400 nm, the control sample, "decal" samples, and graft coated samples have three different spectral profiles. For the purposes of preventing bird strikes, a range of particular interest is from 300 to 400 nm, where many birds have vision, yet humans do not. This includes the entire UV-A range of 315 to 400 nm, and some of the UV-B range of 280-315 nm. As indicated in FIG. 1, the uncoated (control) glass sample has the lowest R profile in this part of the spectrum. The "decal" samples have R values of up to 0.05-5% higher than the control sample, and the graft coated samples have R values of up to 0.08-8%—higher. The latter amounts to up to a doubling of total R with respect to the control sample in the UV—A spectrum.

Figure 2:
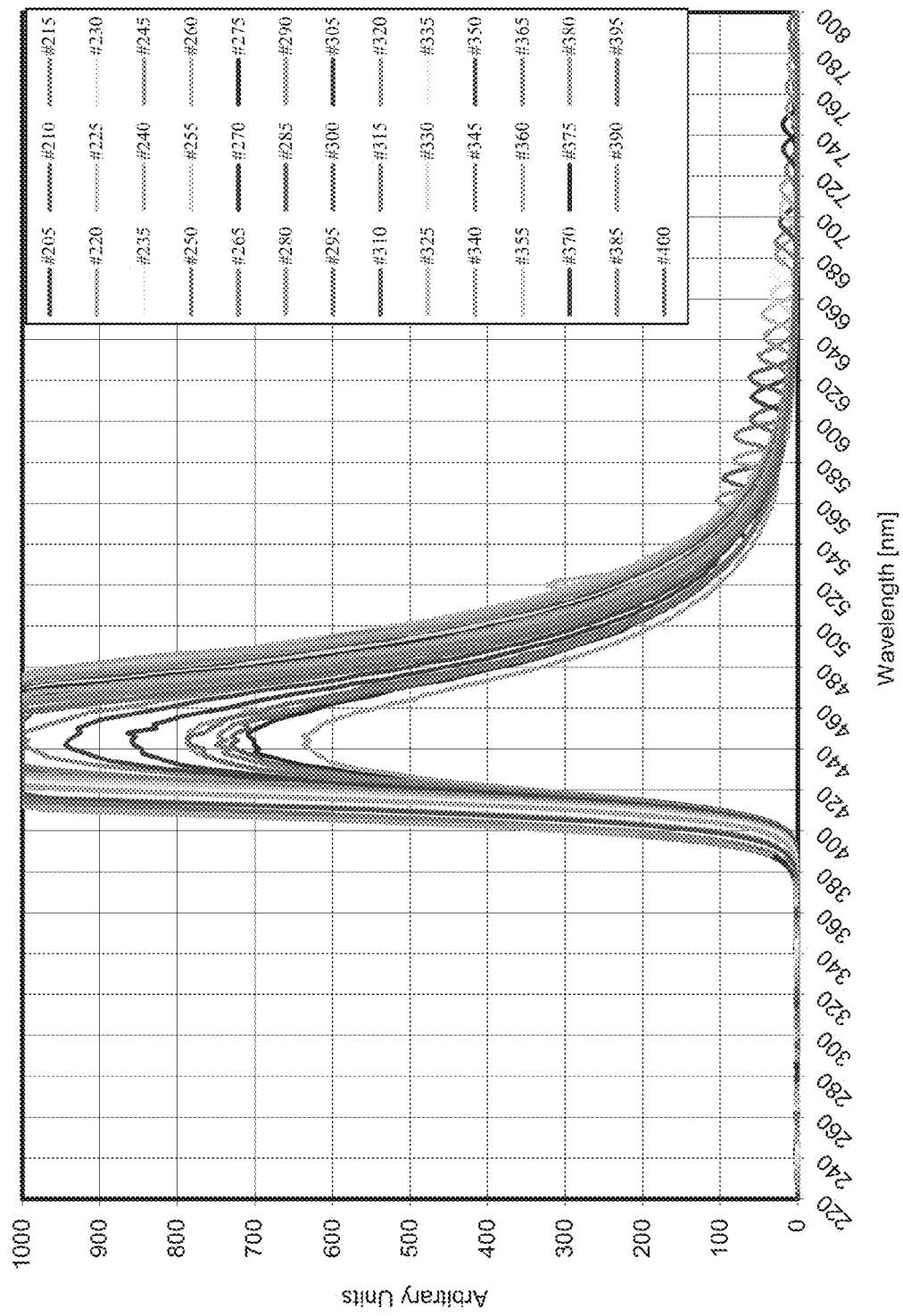
FIG. 2 illustrates a graph showing the fluorescence of one of the three graft-coated glass samples of FIG. 1, in accordance with various embodiments.

Next, as illustrated in FIG. 2, emission spectra for the graft coated sample were plotted. The x-axis runs from 210 to 800 nm, and the y-axis runs from 0 to 1000 in arbitrary units. The excitation and emission slit widths were held at 5 nm, so there is enough overlap to capture all the emission spectra. The scan numbers refer to the excitation wavelengths, which were held constant for each scan. The excitation wavelengths were incremented 5 nm for each scan, and the emission scan for that excitation begins 5 nm above the excitation wavelength and ends at 800 nm. For many of the excitation scans, powerful fluorescence was measured at about 430 nm. Indeed, the maxima far exceeded the limits on the instrument of 1000 arbitrary units. The small, sequential maxima at longer wavelengths represent second harmonics of the excitation wavelength. The instrument was checked with a reference cell. Its peak appears at about 474 nm at about 20 units. Thus, the graft coated sample showed strong fluorescence emissions for each of the excitation wavelengths, which, in concert with the increased reflectance described above, would increase the visibility of the glass to birds.

Focusing more particularly on the portion of the "tail" of the main peak that extends into the UV range of the light spectrum, four combinations of excitation wavelength/spectral width and emission wavelength range/spectral width were selected to highlight emissions between 380-400 nm. These are illustrated in FIG. 3. The x-axis run from 380 to 500 nm; these are the emission scan wavelengths. The y-axis runs from 0 to 1000 in arbitrary units. Four scans are shown and are listed in order of increasing strength, which is expressed in term of the peak height. Two factors control peak height: the width of the excitation and emission slits. Excitation widths of 10 nm centered at 375 nm and 20 nm centered at 370 nm were chosen to simulate the maximum UV solar radiation below 380 nm. Excitation wavelengths of >380 nm would interfere with the emission measurements.

The data show that for a given emission spectral width, the 20 nm excitation width generated a stronger fluorescence signal than the 10 nm width. Comparing the fluorescence signals for two emission widths, 1.5 and 2.5 nm, the latter understandably was higher. There was considerable fluorescence energy in the UV spectrum between 380 and 400 nm; which would affect the visual appearance of the window for birds, but not humans.

Example 7

Modification of Graft Coating Formula to Shift the Fluorescence Peak from the Visible Portion of the Spectrum to the UV Portion of the Spectrum As shown above in FIG. 2 and Example 6, in various embodiments, the graft coatings disclosed herein may fluoresce in the visible range of the UV spectrum. Although this portion of the spectrum is visible to birds and works in concert with reflectance to prevent bird strikes far better than formulations that only reflect and do not fluoresce, in some embodiments it may be desirable to shift the fluorescence spectrum to the UV range, where it may be seen by birds, but not humans. One of skill in the art will appreciate that this shift in emission wavelengths may be achieved by the addition of a water-insoluble optical brightener, such as Tinopal™ (e.g., disodium4,4 'bis-(2-morpholino-4-anilino-s-triazin-6-ylamino) stilbene disulphonate or disodium 2,2'bis-(phenyl-styryl) disulphonate, Ciba-Geigy AG, Basel, Switzerland) and/or Uvitex™ (e.g., 2,5-thiophenediylbis(5-tert-butyl-1,3-benzoxazole, from BASF in Ludwigshafen, Germany) to any of the example formulations described above. For example, a graft coating formulation may be modified as follows if fluorescence in the UV range is desired. Illustrated below is one specific, non-limiting example of a graft-coating formulation that fluoresces in the UV range of the light spectrum in accordance with various embodiments.

| Name of Chemical | Parts by Weight |
| --- | --- |
| D.B. Solvent (Butyl Carbitol) | 80.00 |
| Isopropyl Alcohol | 160.00 |
| Alkoxylated Aliphatic Diacrylate Ester Monomer - SR 9209A | 0.10 |
| Alkoxylated Cyclohexane Dimethanol Diacrylate Ester Monomer CD 582 | 0.10 |
| Benzo Pyranone Pylaklor White S-5 | 2.40 |
| Deionized Water | 200.00 |
| 0.1% Urea Peroxide in Water | 0.10 |
| 0.1% Ferrous Ammonium Sulfate | 0.10 |
| Dispersant Triton X100 ™ | 2.50 |
| 2.0% Fluorosurfactant FC 4430 in Water | 3.00 |
| Aliphatic Urethane Prepolymer Picassian PU490 | 40.00 |
| Tinopal ™ | 0.40 |

Another example of a graft coating formulation modified to shift the fluorescence to the UV range of the spectrum is shown below.

| Name of Chemical | Parts by Weight |
| --- | --- |
| Diethylene Glycol Monobutyl Ether (D.B. Solvent) | 80.00 |
| Isopropyl Alcohol | 80.00 |
| Dispersant Triton X-IOO ™ | 3.00 |
| Polyethylene Glycol 400 Dimethacrylate SR344 | 0.50 |
| Deionized water | 200.00 |
| Aqueous Polyurethane Dispersion Picassian PU 490 ™ | 120.00 |
| Fluoro Surfactant FC 4430, 2.0% solution in water | 4.00 |
| Alkoxylated Triacrylate SR 9035 | 2.00 |
| Urea Peroxide 1.0% solution in water | 0.20 |
| Silver Perchlorate 0.1% solution in water | 0.10 |
| Benzo Pyranine Pylaklor White | 3.00 |
| Polyazridine catalyst CX-IOO | 0.80 |
| Uvitex ™ | 0.2 |

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents.

What is claimed is:

1. A graft coating formulation for windows, comprising:
   a first acrylic monomer;
   a second acrylic monomer;
   a graft initiator;
   a fluorescent agent; and
   a catalyst, wherein at least one of the first and second acrylic monomers is a diacrylic monomer, and wherein when applied to a substrate, the graft coating formulation reflects more than about 70% incident light having a wavelength of less than 400 nm and fluoresces when exposed to light having a wavelength of less than about 400 nm.

2. The graft coating formulation of claim 1, wherein the graft coating formulation further comprises a vinyl monomer.

3. The graft coating formulation of claim 1, wherein the graft coating formulation further comprises a urethane prepolymer.

4. The graft coating formulation of claim 3, wherein the urethane prepolymer comprises a hydroxyl, carboxyl or glycidyl group.

5. The graft coating formulation of claim 1, wherein the first acrylic monomer comprises a hydroxyl, carboxyl or glycidyl group.

6. The graft coating formulation of claim 1, wherein the first acrylic monomer is Polyethylene Glycol (400) Diacrylate.

7. The graft coating formlation of claim 1, wherein the first acrylic monomer is an Alkoxylated Aliphatic Diacrylate Ester Monomer.

8. The graft coating formulation of claim 1, wherein the second acrylic monomer is an Alkoxylated Triacrylate.

9. The graft coating formulation of claim 1, wherein the second acrylic monomer is an Alkoxylated Cyclohexane Dimethanol Diacrylate Ester Monomer.

10. The graft coating formulation of claim 1, wherein the graft initiator is silver perchlorate.

11. The graft coating formulation of claim 1, wherein the catalyst is urea peroxide.

12. The graft coating formulation of claim 1, wherein the first acrylic monomer is Polyethylene Glycol (400) Diacrylate wherein the second acrylic monomer is Alkoxylated Triacrylate, wherein the graft initiator is silver perchlorate, and wherein the catalyst is urea peroxide.

13. The graft coating formulation of claim 1, wherein the acrylic monomer is Alkoxylated Aliphatic Diacrylate Ester Monomer, wherein the diacrylic monomer is Alkoxylated Cyclohexane Dimethanol Diacrylate Ester Monomer, wherein the graft initiator is silver perchlorate, and wherein the catalyst is urea peroxide.

14. The graft coating formulation of claim 1, wherein the graft coating formulation forms a chemical bond with a substrate when applied to the substrate.

15. The graft coating formulation of claim 14, wherein the chemical bond is permanent.

16. The graft coating formulation of claim 14, wherein the chemical bond has a lifetime of approximately six months.

17. The graft coating formulation of claim 14, wherein the graft coating formulation is removable with detergent.

18. The graft coating formulation of claim 1, wherein the substrate comprises glass, polyethylene, polypropylene, polyvinyl chloride, polycarbonate, or polyethylene terephthalate.

* * * * *